United States Patent
Shaw et al.

[11] Patent Number: 6,014,862
[45] Date of Patent: Jan. 18, 2000

[54] EMULATOR DAMPING MECHANISM

[75] Inventors: Schuyler Scott Shaw, Dayton; Donald Edward Schenk, Vandalia, both of Ohio

[73] Assignee: General Motors Corporation, Detroit, Mich.

[21] Appl. No.: 09/048,491

[22] Filed: Mar. 26, 1998

[51] Int. Cl.$^7$ .................................................. F15B 21/12
[52] U.S. Cl. ................................... 60/533; 60/586; 92/82
[58] Field of Search ........................... 60/579, 580, 581, 60/533, 585, 586; 92/84, 82

[56] References Cited

U.S. PATENT DOCUMENTS

| | | | |
|---|---|---|---|
| 2,112,356 | 3/1938 | Bock | 60/586 |
| 2,580,851 | 1/1952 | Seppmann | 60/585 |
| 3,522,706 | 8/1970 | Bueler | 60/586 |
| 4,373,333 | 2/1983 | Coleman | 60/578 |
| 4,773,224 | 9/1988 | Sakamoto et al. | 60/585 |
| 5,246,283 | 9/1993 | Shaw et al. | 303/115.2 |
| 5,603,217 | 2/1997 | Majersik et al. | 60/562 |
| 5,720,170 | 2/1998 | Hageman et al. | 60/562 |
| 5,729,979 | 3/1998 | Shaw et al. | 60/533 |

FOREIGN PATENT DOCUMENTS

| | | | |
|---|---|---|---|
| 393581 | 6/1932 | United Kingdom | 60/585 |

*Primary Examiner*—F. Daniel Lopez
*Attorney, Agent, or Firm*—Jeffrey A. Sedlar; Robert M. Sigler

[57] ABSTRACT

A brake system includes a pedal feel emulator and a master cylinder with a damping mechanism having a damping piston. When the emulator piston is moved from the at-rest position, fluid is displaced from the emulator through a compensation port and through a flow restrictive orifice in the damping piston to the reservoir. Flow rate of the fluid is dependent on the apply rate of the brake pedal. When the brake pedal is applied relatively slowly, sufficient flow volume will occur through the flow restrictive orifice and the damping piston will remain unmoved. As apply rates increase, a sufficient pressure differential will eventually be established across the damping piston to cause it to move. Damping piston movement compensates for rapid fluid displacement out of the variable chamber and enables a desirable pedal feel characteristic where pedal force increases relatively slowly as pedal velocity increases relatively rapidly. As the damping piston movement provides increasing volume, the pressure differential drops across the damping piston and it will cease to move as flow is accommodated solely through the flow restrictive orifice. As this occurs, pedal force will increase more rapidly providing a two-stage damping characteristic.

12 Claims, 2 Drawing Sheets

EMULATOR DAMPING MECHANISM

TECHNICAL FIELD

The present invention relates to an emulator damping mechanism and more particularly, to a damping mechanism of a brake pedal feel emulator in a vehicle's wheel brake system for closely matching the performance feel of a conventional vacuum boosted brake apply system through dual stage operation.

BACKGROUND OF THE INVENTION

With a brake-by-wire, or similar type of vehicle braking system, where the application of fluid brake pressure to the wheel brakes can be generated by an electrically or an electro-hydraulically controlled means rather than by the manual application of force to the master cylinder, the master cylinder is typically isolated from the rest of the braking system during brake operation. This changes the response characteristics at the vehicle's brake pedal from those conventionally provided and can prevent the driver from experiencing the customary brake pedal travel and feel. These automated types of braking systems generally do not include a conventional booster between the brake pedal and the master cylinder, which may contribute to pedal response changes.

It is preferable that the vehicle driver experience a conventional pedal response when applying a vehicle's brakes on a vehicle with electric or electro-hydraulic brake control. In some applications, such a control system is preferably "transparent" to the driver, and the brake apply system would be perceived to respond the same as a conventionally boosted apply system. Accordingly, brake by wire systems include ancillary components to approximate conventional pedal characteristics during brake application. These ancillary components increase costs, require additional space and can interject discernible differences into the pedal feel characteristic during brake application cycles.

A known device that mimics the conventional pedal feel when the master cylinder is isolated from the remainder of the braking system is disclosed in U.S. Pat. No. 5,246,283 entitled Electro-Hydraulic Brake Apply System, which issued Sep. 21, 1993. That patent describes a stand alone accumulator with movable pistons separated by a pair of springs. The pistons move against the springs to provide compliance in the system, so that the driver experiences customary pedal feel and travel rather than a hard pedal.

Additional efforts have been directed at more closely approximating conventional brake apply feel at the pedal. The use of additional springs, providing gaps adjacent springs or integrating the device into a master cylinder have been found to help in this regard. One such device is disclosed in U.S. Pat. No. 5,630,217 entitled Compliant Mater Cylinder, which issued Feb. 18, 1997. That patent discloses a master cylinder with a compliant assembly that provides conventional pedal feel and travel characteristics when the master cylinder pistons are substantially immovable. The compliant assembly includes a push rod piston that is movable against a selected amount of fluid pressure and spring force.

The strides that have been made in approximating the conventional pedal feel characteristics of a brake apply system have resulted in good emulation of pedal travel versus pedal force for a typical passenger vehicle during various brake applications. Accordingly, automated apply systems are presently capable of providing acceptable pedal feel characteristics. However, because pedal feel is a subjective quantity, additional advancements in the art are still preferable, especially since a great many variables contribute to the pedal feel response of any given system.

SUMMARY OF THE INVENTION

The present invention provides a variable rate pedal feel emulator that supplies the typical brake pedal travel and feel characteristics to a brake system when the master cylinder is isolated from the wheel brakes. As part of the present invention it has been found that it is preferable for the emulator system to provide pedal damping characteristics in addition to supplying acceptable pedal travel versus force characteristics.

A preferred embodiment of the invention provides a pedal feel emulator assembly associated with the primary piston of the master cylinder and the brake pedal push rod. The emulator piston is movable against the force of a spring element and fluid forces upon the application of manual pressure to the brake pedal, even when the primary piston is substantially immovable due to isolation of the master cylinder from the remainder of the braking system. A brake master cylinder assembly according to this preferred embodiment includes a body having a master cylinder bore and at least one transverse bore. A fluid reservoir is carried near the body and communicates with the transverse bore. A compensation port extends through the body between the transverse bore and the master cylinder bore providing a means of communicating fluid between the master cylinder and the reservoir. Within the area of the transverse bore a damping piston operates in response to high flow rates through the compensation port. A specifically tuned flow restrictive orifice is provided in the damping piston between the variable chamber and the reservoir. In addition, a high return flow check valve is provided between the variable chamber and the reservoir.

In operation, when force is applied to the braking pedal of a vehicle incorporating the present invention and the master cylinder is isolated from the remainder of the hydraulic braking system, the push rod applies the pedal force to the emulator piston which is movable against the spring element and fluid forces providing the customary brake pedal travel and feel. This occurs while the primary piston remains substantially immovable due to the non-compressibility of the braking fluid trapped in the master cylinder's high pressure chambers. According to a preferred aspect of the present invention, when the emulator piston is moved from the at-rest position, fluid in the variable chamber between the primary piston unit and the emulator piston is forced through at least one orifice in the primary piston unit or emulator piston and is communicated through the compensation port and through the flow restrictive orifice in the damping piston to the reservoir. Flow rate of the fluid is dependent on the apply rate of the brake pedal. When the brake pedal is applied relatively slowly, the flow rate will be low and damping is not required. Sufficient flow volume will occur through the flow restrictive orifice and the damping piston will remain unmoved. As apply rates increase, a sufficient pressure differential will eventually be established across the damping piston to cause it to move. Damping piston movement compensates for rapid fluid displacement out of the variable chamber and enables a desirable pedal feel characteristic where pedal fore increases relatively slowly as pedal velocity rapidly increases. As the damping piston movement provides increasing volume the pressure differential drops across the damping piston and it will cease to move as flow is accommodated solely through the flow restrictive orifice. As this occurs, pedal force will increase more rapidly.

The preferred system is designed so that when the master cylinder is not isolated from the remainder of the associated braking system travel of the emulator piston effects movement of the primary piston. This ensures that the master cylinder can be utilized to provide a pressure source for braking application in a conventional manual apply manner when desired or needed. In such operation, the master cylinder's pistons are manually moved to pressurize the braking system through the high pressure chambers. During a manual apply mode the present invention provides a mechanical/hydraulic means of shutting off or by-passing the emulator. This occurs when preferred isolating solenoid valves open, permitting the primary and secondary pistons to move to generate braking pressure. The otherwise additional travel of the emulator is not added to pedal travel during manual mode operation.

DESCRIPTION OF THE PREFERRED EMBODIMENT

Figure 1:
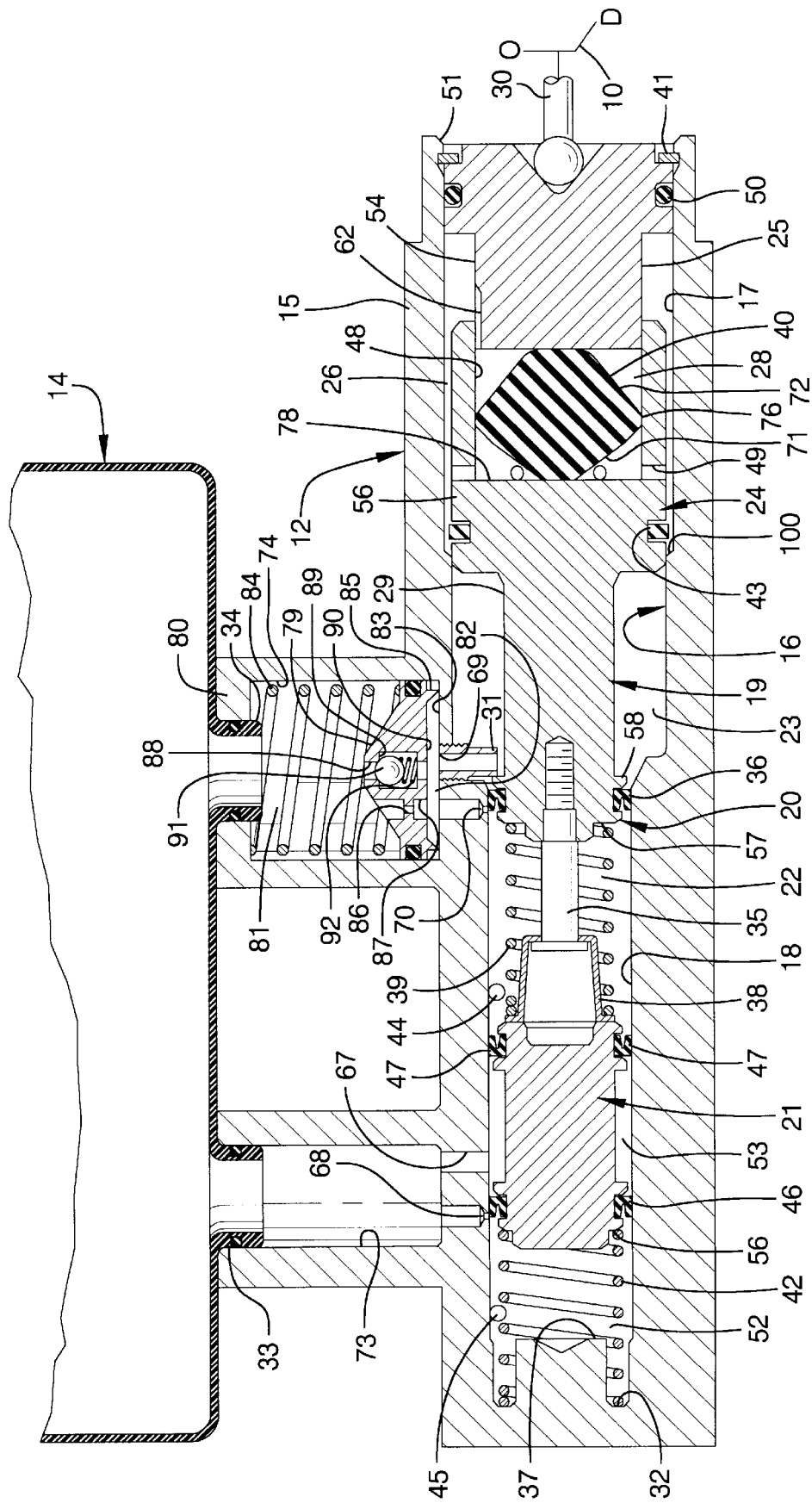
FIG. 1 is a fragmentary cross sectional view of a brake system's master cylinder and emulator assembly according to the present invention.

Referring to the drawings, illustrated in FIG. 1 is a brake apply system's master cylinder and emulator assembly in accordance with the present invention designated in the aggregate as 12. The master cylinder and emulator assembly 12 includes a body 15 formed of an acceptably rigid material such as metal or plastic and an associating fluid reservoir 14. The master cylinder and emulator assembly 12 is responsive to the manual application of force to a brake pedal 10, through the push rod 30.

A stepped longitudinal bore 16 extends through body 15 and slidably carries a plural piston arrangement including primary piston unit 19, secondary master cylinder piston 21 and emulator piston 25. The primary piston unit 19 is arranged in a subassembly that includes primary master cylinder piston 20 and intermediate piston 24 which, in the present embodiment are formed together as a one piece rigid body. A spring retainer 38 is slidably retained on primary master cylinder piston 20 by means of fastener 35. A return spring 39 is carried between spring retainer 38 and shoulder 57 of primary master cylinder piston 20. The primary piston unit subassembly also includes a seal 36 carried in a circumferential groove between shoulder 57 and shoulder 58 of primary master cylinder piston 20. The seal 36 bears against the wall of stepped longitudinal bore 16 in master cylinder bore 18 and provides fluid separation between primary high pressure master cylinder chamber 22 and intermediate chamber 23.

A seal 43 is carried on intermediate piston 24 and is spaced away from the wall of stepped longitudinal bore 16 in emulator bore 17. The seal 43 effects fluid separation between intermediate chamber 23 and chamber 26, when positioned to the left of step 100, where it bears against the wall of stepped longitudinal bore 16 formed by body 15. The seal 43 provides fluid communication between intermediate chamber 23 and chamber 26 when positioned to the right of step 100 as shown. Seals 36 and 43 of primary piston unit 19 define movable boundaries of chamber 26, intermediate chamber 23, and primary high pressure master cylinder chamber 22 within stepped longitudinal bore 16 as detailed below.

Primary piston unit 19 includes a longitudinal bore 48 that enters into the intermediate piston 24 within chamber 26 and extends partially through the primary piston unit 19. A plurality of orifices, represented by orifice 49, extend radially through primary piston unit 19 intersecting longitudinal bore 48. The longitudinal bore 48 defines variable chamber 28 in cooperation with the emulator piston 25. Variable chamber 28 is in continuously open fluid communication with chamber 26 through the orifices 49. The primary piston unit 19 and specifically, the primary master cylinder piston 20 is operable to selectively pressurize a braking circuit (not illustrated), through outlet opening 44.

Secondary master cylinder piston 21 is substantially spool-shaped and is slidably carried in master cylinder bore 18 of stepped longitudinal bore 16 to the left of primary master cylinder piston 20 as viewed in FIG. 1. Secondary master cylinder piston 21 is engaged by spring retainer 38 of the primary piston unit subassembly. A return spring 42 extends between the shoulder 56 of secondary master cylinder piston 21 and the spring seat 32 at blind end 37 of the stepped longitudinal bore 16. The return spring 42 biases the secondary master cylinder piston 21 toward the primary master cylinder piston 20. Similarly, the return spring 39 biases the primary master cylinder piston 20 toward the emulator piston 25.

Secondary master cylinder piston 21 carries a primary seal 46 fluidly separating master cylinder bore 18 into secondary high pressure master cylinder chamber 52 and secondary low pressure master cylinder chamber 53. Secondary master cylinder piston 21 also carries a secondary seal 47 that separates secondary low pressure master cylinder chamber 53 from primary high pressure master cylinder chamber 22 within the master cylinder bore 18. The secondary master cylinder piston 21 is operable to selectively pressurize a braking circuit (not illustrated), through the outlet opening 45.

Master cylinder body 15 is adapted to receiving bayonets 33 and 34 of a conventional reservoir 14 within bores 73 and 74, respectively. A compensation port 67 provides an opening between reservoir 14 and master cylinder bore 18 into secondary low pressure chamber 53. A bypass hole 68 provides an opening between reservoir 14 and master cylinder bore 18 into secondary high pressure master cylinder chamber 52 when the secondary master cylinder piston 21 is in the at-rest position shown in FIG. 1. During a manual apply mode, when the secondary master cylinder piston 21 is moved to an apply position, the primary seal 46 is moved to a position to the left, (as viewed in FIG. 1), of bypass hole 68 so that the bypass hole 68 provides an opening between reservoir 14 and secondary low pressure master cylinder chamber 53.

Similarly, a compensation port 69 provides an opening between reservoir 14 and the master cylinder bore 18 of stepped longitudinal bore 16 into intermediate chamber 23. Additionally, a bypass hole 70 provides an opening between reservoir 14 and master cylinder bore 18 of stepped longitudinal bore 16 into primary high pressure master cylinder chamber 22 when the primary master cylinder piston 20 is in the at-rest position shown in FIG. 1. During a manual apply mode when the primary master cylinder piston 20 is moved to an apply position, the seal 36 is moved to a position to the left, (as viewed in FIG. 1), of bypass hole 70 so that the bypass hole 70 provides an opening between reservoir 14 and intermediate chamber 23. The compensation ports 67, 69 and the bypass holes 68, 70 provide fluid routes between the reservoir 14 and the stepped longitudinal bore 16.

The primary piston unit 19 resembles a spool and includes an annular undercut 29 formed around its circumference defining intermediate chamber 23 in cooperation with the wall of stepped longitudinal bore 16. The seal 36 operates to permit fluid compensation flow into the primary high pressure master cylinder chamber 22 from the intermediate chamber 23 when the primary master cylinder piston 20 moves back to the illustrated at-rest position from an apply position. A stop pin 31 is threaded into the body 15 and forms the compensation port 69. The stop pin 31 engages shoulder 58 to limit travel of primary piston unit 19 to the right as viewed in FIG. 1. The primary piston unit 19 is biased toward the stop pin 31 by return springs 39 and 42.

The bore 74 is formed by an annular extension that projects from body 15 and includes annular flange 80 that supports the reservoir 14 and engages the bayonet 34, with a fluid tight seal provided therebetween. A damping piston 79 is slidably and sealingly disposed in the bore 74 and separates the bore 74 into a compensation chamber 81 and a damping chamber 82. The damping piston 79 carries a seal in an annular groove that engages the wall of bore 74 permitting the damping piston 79 to slide while substantially preventing the transmission of fluid around its outer perimeter. Damping piston 79 is biased toward end wall 83 by a spring 84 that engages the damping piston 79 and bears against annular flange 80. Damping piston 79 includes an annular rib 85 that operates as a stop against end wall 83 maintaining some volume in the damping chamber 82 when in the fully returned position shown. A first bore 87 extends through the damping piston 79 and includes a flow restrictive orifice 86 that provides a continuously open flow path between the damping chamber 82 and the compensation chamber 81. The flow restrictive orifice 86 is tuned for the specific performance desired in a given application. A second bore 88 extends through the damping piston 79 from damping chamber 82 to compensation chamber 81. The bore 88 includes a valve seat 89 that faces the damping chamber 82 and includes an annular ledge 90. A valve obturator in the form of ball 91 is carried in the bore 88 between valve seat 89 and ledge 90. The ball 91 is biased toward the valve seat 89 by a spring 92 and operates as a check, preventing fluid flow through the bore 88 from damping chamber 82 to compensation chamber 81 and permitting fluid flow through the bore 88 from the compensation chamber 81 to the damping chamber 82. This check valve feature provides a mechanism for allowing rapid back flow of fluid from the reservoir 14 into the variable chamber 28 during pedal release.

During operation of the associating braking system, the primary high pressure master cylinder chamber 22 and the secondary high pressure master cylinder chamber 52 typically become closed off and isolated from the remainder of the braking system preventing the communication of fluid through outlet openings 44 and 45. This means that the primary piston unit 19 becomes substantially immovable due to the non-compressible fluid trapped in the chambers 22 and 52. To provide desirable feel and travel characteristics to the brake pedal, compliancy is provided in the system by means of damping piston 79 and the emulator piston 25, elastomeric body 40, orifices 49, and slots 62.

Emulator piston 25 is slidably carried in emulator bore 17 of stepped longitudinal bore 16 and is maintained therein by retaining ring 41. The emulator piston 25 carries seal 50 to maintain the fluid tight integrity of the rear opening 51 to stepped longitudinal bore 16. The emulator piston 25 also includes a post 54 which extends toward the primary piston unit 19 and is coupled therewith by extending into longitudinal bore 48. A number of fluid relief slots are formed in post 54, representative of which is slot 62. The slot 62 provides a route for fluid to move between the variable chamber 28 and the chamber 26. The emulator piston 25 operates to provide a preselected response at the push rod 30 when actuated by brake pedal 10 during a braking event that effects hydraulic isolation of the master cylinder assembly from the vehicle's wheel brakes (not illustrated).

When the master cylinder assembly is isolated from the wheel brakes, fluid in chambers 22 and 52 is unable to move through outlet openings 45 and 44. In such a case, when force is applied to the associating brake pedal 10, push rod 30 is caused to apply force to emulator piston 25 such that movement of the emulator piston 25 occurs. Fluid is forced from the variable chamber 28 through the orifices 49 and slots 62 into the chamber 26. From chamber 26, fluid is forced around the outside diameter of seal 43 and is communicated into intermediate chamber 23. The fluid is contained in intermediate chamber 23 and chamber 26 by the seal 50 and the seal 36 which is held against the wall of stepped longitudinal bore 16 by trapped fluid in primary high pressure master cylinder chamber 22. Therefore, the fluid transmission effected into intermediate chamber 23 by displacement of emulator piston 25 is directed through compensation port 69 into bore 87 and toward reservoir 14.

The emulator assembly operates to provide the selected pedal response and feel through the push rod 30 even though the master cylinder pistons 20 and 21 are immovable. Optionally, the emulator assembly may be located remotely from the master cylinder. With such a stand alone embodiment, the variable chamber 28 may optionally contain air or other gas that is relieved to the atmosphere or an accumulator. The emulator assembly's elastomeric body 40 is a solid body of natural or synthetic rubber, or may be replaced with a variety of spring elements as are known in the art. Elastomeric body 40 includes a circular perimeter surface 76 that bears against the wall of longitudinal bore 48 in the present embodiment, with a space optionally provided between the circular perimeter surface and the wall of longitudinal bore 48. This will accommodate expansion of the body 40 in a radial direction, which may be preferable depending upon the response required at the pedal 10, for a given application. On a first side of the perimeter surface 76 the elastomeric body 40 has a curved surface 71 that bears against the end wall 78 of longitudinal bore 48. On a second side of the perimeter surface 76 the elastomeric body has a conical surface 72 with an end that bears against the post 54 of emulator piston 25.

The following description relates to operation of the present embodiment with the master cylinder isolated from the associated braking system. As the brake pedal 10 is applied, the post 25 moves toward the end wall 78 of longitudinal bore 48 reducing the size of variable chamber 28. Fluid is forced from the variable chamber 48 through the orifices 49 and slots 62. The orifices 49 and slots 62 are sized to provide a selected amount of resistance to fluid flow. This provides a manner of tailoring the response of the emulator assembly. As the variable chamber is reduced in size, the elastomeric body 40 is compressed between the post 25 and the end wall 78 and fluid is displaced into chamber 26, around seal 43 through intermediate chamber 23 and compensation port 69 into damping chamber 82. Fluid flow rate through this path is dependent upon the rate of apply at the brake pedal 10. When the apply rate is relatively slow, damping is not required and the fluid entering damping chamber 82 flows through the bore 87 and the flow restrictive orifice 86. The spring 84 keeps the damping piston 79 seated against the end wall 83 of bore 88, and the ball 91 prevents flow through the bore 88. Under slow apply rate conditions the pressure differential developed across the flow restrictive orifice is insufficient to move the damping piston 79 to compress the spring 84.

Figure 2:
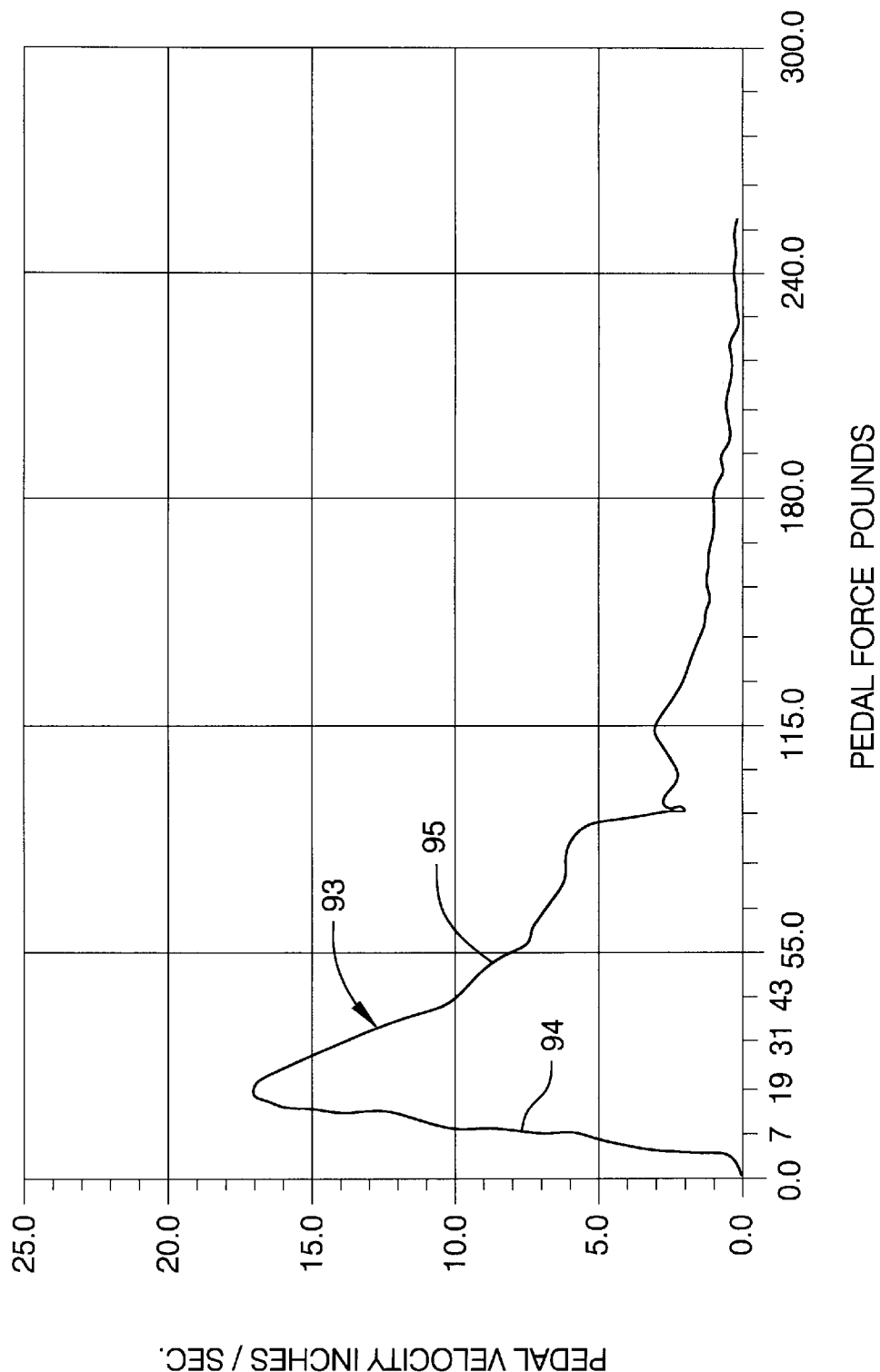
FIG. 2 is a graph of pedal velocity in inches per second versus pedal force in pounds for the assembly of FIG. 1.

When apply rate at the brake pedal 10 is relatively fast, the pressure differential developed across the flow restrictive orifice, as applied on the damping piston 79 is great enough to cause the damping piston 79, to slide within the bore 88 compressing spring 84. The resulting expansion of damping chamber 82 allows for rapid fluid displacement out of the variable chamber 28 and effects a feel characteristic at brake pedal 10 allowing relatively modest increases in pedal force to effect significant pedal velocity rate increases. This damping characteristic is demonstrated graphically in FIG. 2. The initial stage 94 of the curve 93 shows that upon a rapid apply rate, the pedal velocity increases relatively rapidly as the pedal force increases relatively modestly.

When the damping piston 79 has moved providing significantly more volume in the damping chamber 82, the flow rate through the bore 87 drops and the pressure differential across the flow restrictive orifice 86 decreases. When flow conditions no longer effect additional displacement of the damping piston 79, fluid flow through the flow restrictive orifice is sufficient to accommodate the fluid displaced from the variable chamber 28. At this point the pedal damping characteristic of the system is shown by secondary stage 95 of the curve 93 where pedal force increases more rapidly and pedal velocity slows. The damping mechanism provided by damping piston 79 is adaptable to use on other pedal feel emulators that use fluid displacement. If the brake pedal 10 remains depressed, the fluid will flow out of damping chamber 82 to the reservoir 14 through the bore 87 and the damping piston 79 will reseat on end wall 83.

After a brake application, when the manually applied force is removed from the brake pedal 10, the elastomeric body 40 forces the emulator piston 25 to return to the at-rest position illustrated, drawing fluid into the variable chamber 28 through the orifices 49 and the slots 62. The return of the emulator piston 25 is not assisted by fluid force since the fluid source is the unpressurized reservoir 14. When the brake pedal 10 is released, the ball 91 will move to compress the spring 92 allowing additional flow through the damping piston 79 to refill the expanding variable chamber 28.

A means of ensuring that the master cylinder and emulator assembly 12 is operable without an excessive increase in pedal travel in the no-power mode is provided, to apply braking pressure by movement of the pistons 20, 21 if a sufficient amount of force is applied to the push rod 30. When the master cylinder is not isolated from the remainder of the associated braking system, fluid can exit through the outlet openings 44, 45 and the pistons 20, 21 are movable. In response to application of the brake pedal 10, the seal 43 will travel to the left of step 100 and sealingly engage the wall of bore 16. At this position, seals 43 and 50 isolate the non-compressible fluid in the chamber 26 and variable chamber 28. This forms a hydraulic lock in the variable chamber 26 and therefore, does not add additional travel to the no-power apply condition. This enables pressurization of the high pressure chambers 22 and 52 for the application of fluid pressure through the outlet openings 44 and 45 to the associating braking system. Therefore, the master cylinder and emulator 12 provides a second mode for operation of the braking system by means of a manual mechanism to actuate wheel brakes, when required or desired.

We claim:

1. An emulator damping mechanism comprising:
    a master cylinder having a body with a stepped master cylinder bore and a transverse bore open to the master cylinder bore;
    a brake pedal for actuating the master cylinder;
    a reservoir carried near the body and communicating with the transverse bore with a compensation port extending through the body between the transverse bore and the master cylinder bore;
    a primary piston unit slidably carried in the master cylinder bore;
    an emulator piston received in an emulator bore wherein the emulator piston is slidable within the emulator bore when the primary piston is substantially unslidable in the master cylinder bore, wherein a variable chamber is defined adjacent the emulator piston and within the emulator bore so that the emulator piston is movable between an at-rest position and a plurality of apply positions while the primary piston unit remains substantially unmoved wherein the variable chamber is contractible creating a fluid displacement wherein the fluid displacement is proportional to an apply rate of the brake pedal; and
    a damping piston slidably carried in the transverse bore and separating the transverse bore into a damping chamber and a compensation chamber wherein the damping piston has a first bore providing a flow restrictive orifice that is continuously open between the damping chamber and the compensation chamber and wherein when the apply rate is low fluid is displaced from the variable chamber to the reservoir through the flow restrictive orifice without moving the damping piston and when the apply rate is high fluid displaced from the variable chamber is accommodated in the damping chamber as the damping chamber expands by movement of the damping piston.

2. An emulator damping mechanism according to claim 1 wherein the damping piston includes a second bore that extends between the damping chamber and the compensation chamber with a check valve in the second bore so that fluid flow from the damping chamber to the compensation chamber through the second bore is obstructed and fluid flow from the compensation chamber to the damping chamber is allowed through the second bore providing fluid to flow from the reservoir to the variable chamber during release of the brake pedal.

3. An emulator damping mechanism according to claim 2 wherein the transverse bore has an end wall and the damping piston is spaced away from the end wall by a rib.

4. An emulator damping mechanism according to claim 3 wherein the damping piston is biased toward the end wall by a spring that extends between the damping piston and an annular flange on the master cylinder body.

5. An emulator damping mechanism according to claim 1 wherein when the apply rate is high, movement of the damping piston results in a two stage damping characteristic wherein a first stage results in relatively modest rate increases in pedal force and a second stage results in relatively greater rate increases in pedal force.

6. An emulator damping mechanism comprising:
    a master cylinder having a body with a stepped master cylinder bore and a transverse bore open to the master cylinder bore;
    a brake pedal for actuating the master cylinder;
    a reservoir carried near the body and communicating with the transverse bore with a compensation port extending through the body between the transverse bore and the master cylinder bore;

a primary piston unit slidably carried in the master cylinder bore;

an emulator piston received in an emulator bore wherein the emulator piston is slidable within the emulator bore when the primary piston is substantially unslidable in the master cylinder bore, wherein a variable chamber is defined adjacent the emulator piston and within the emulator bore so that the emulator piston is movable between an at-rest position and a plurality of apply positions while the primary piston unit remains substantially unmoved wherein the variable chamber is contractible creating a fluid displacement wherein the fluid displacement is proportional to an apply rate of the brake pedal;

a spring positioned in the variable chamber wherein the spring element is compressible in response to application of the brake pedal and expandable to expand the variable chamber when the brake pedal is released; and a damping piston slidably carried in the transverse bore and separating the transverse bore into a damping chamber and a compensation chamber wherein the damping piston has a first bore providing a flow restrictive orifice that is continuously open between the damping chamber and the compensation chamber and wherein when the apply rate is low fluid is displaced from the variable chamber to the reservoir through the flow restrictive orifice without moving the damping piston and when the apply rate is high fluid displaced from the variable chamber is accommodated in the damping chamber as the damping chamber expands by movement of the damping piston.

7. An emulator damping mechanism according to claim 6 wherein the damping piston includes a second bore that extends between the damping chamber and the compensation chamber with a check valve in the second bore so that fluid flow from the damping chamber to the compensation chamber through the second bore is obstructed and fluid flow from the compensation chamber to the damping chamber is allowed through the second bore providing fluid to flow from the reservoir to the variable chamber during release of the brake pedal.

8. An emulator damping mechanism according to claim 7 wherein the transverse bore has an end wall and the damping piston is spaced away from the end wall by a rib.

9. An emulator damping mechanism according to claim 8 wherein the damping piston is biased toward the end wall by a spring that extends between the damping piston and an annular flange on the master cylinder body.

10. An emulator damping mechanism according to claim 6 wherein when the apply rate is high, movement of the damping piston results in a two stage damping characteristic wherein a first stage results in relatively modest rate increases in pedal force and a second stage results in relatively greater rate increases in pedal force.

11. A brake pedal feel emulator according to claim 6 wherein the primary piston unit carries a seal that shuts off the fluid flow metered out of the variable chamber by engagement between the seal and the body within the master cylinder bore during a manual apply mode of operation.

12. A brake master cylinder and pedal feel emulator comprising:

a body having a stepped master cylinder bore and having a transverse bore extending into the body;

a reservoir carried on the body and communicating with the transverse bore with a compensation port extending through the body between the transverse bore and the stepped bore;

a primary piston unit slidably carried in the stepped master cylinder bore having a first side and a second side wherein an emulator bore is formed in the first side of the primary piston unit and a first flow restrictive orifice is formed in the primary piston unit opening to the emulator bore;

an emulator piston slidably received within the emulator bore wherein a variable chamber is defined between the primary piston unit and the emulator piston within the emulator bore, the emulator piston having a post extending into the variable chamber toward the primary piston unit, the emulator piston being movable between an at-rest position and a plurality of apply positions while the primary piston unit remains substantially unmoved wherein the variable chamber is contractible and expansible;

a push rod engaging the emulator piston;

a brake pedal engaging the push rod;

a spring element positioned in the variable chamber wherein the spring element is compressible between the emulator piston and the primary piston unit upon application of a force to the brake pedal; and a damping piston slidably carried in the transverse bore and separating the transverse bore into a damping chamber and a compensation chamber wherein the damping piston has a first bore providing a second flow restrictive orifice that is continuously open between the damping chamber and the compensation chamber and a second bore carrying a check valve obstructing flow through the second bore from the damping chamber to the compensation chamber and allowing flow through the second bore from the compensation chamber to the damping chamber;

wherein a flow path is defined between the reservoir and the variable chamber, the flow path including the second flow restrictive orifice and the compensation port, with the emulator piston being movable between an at-rest position and a plurality of apply positions at an apply rate while the primary piston unit remains substantially unmoved wherein the variable chamber is contractible and expansible so that when the emulator piston is moved from the at-rest position, fluid in the variable chamber is forced through the first flow restrictive orifice, the compensation port and the second flow restrictive orifice to the reservoir, wherein when the apply rate is low fluid is displaced from the variable chamber to the reservoir without moving the damping piston and when the apply rate is high fluid displaced from the variable chamber is accommodated in the damping chamber as the damping chamber expands by movement of the damping piston.

* * * * *